US012766350B2

(12) United States Patent
Kieras et al.

(10) Patent No.: US 12,766,350 B2
(45) Date of Patent: Oct. 20, 2026

(54) CONTAINER AND CLOSURE SYSTEMS WITH FLAME MITIGATION

(71) Applicant: RIEKE LLC, Auburn, IN (US)

(72) Inventors: Ronald Kieras, McHenry, IL (US); Jeff Greenfield, Auburn, OH (US); Gary Baughman, Fort Wayne, IN (US)

(73) Assignee: RIEKE LLC, Auburn, IN (US)

( * ) Notice: Subject to any disclaimer, the term of this patent is extended or adjusted under 35 U.S.C. 154(b) by 0 days.

(21) Appl. No.: 18/862,194

(22) PCT Filed: May 4, 2023

(86) PCT No.: PCT/US2023/020958

§ 371 (c)(1),
(2) Date: Nov. 1, 2024

(87) PCT Pub. No.: WO2023/215451

PCT Pub. Date: Nov. 9, 2023

(65) Prior Publication Data

US 2025/0339716 A1 Nov. 6, 2025

Related U.S. Application Data

(60) Provisional application No. 63/351,965, filed on Jun. 14, 2022, provisional application No. 63/342,211,
(Continued)

(51) Int. Cl.
*A62C 4/00* (2006.01)
*A62C 3/06* (2006.01)
(Continued)

(52) U.S. Cl.
CPC ................ *A62C 3/065* (2013.01); *A62C 4/00* (2013.01); *B65D 25/385* (2013.01);
(Continued)

(58) Field of Classification Search
CPC ...... B65D 25/385; B65D 51/22; B65D 51/20; B65D 25/40; B65D 47/043; A62C 3/06; A62C 3/065
(Continued)

(56) References Cited

U.S. PATENT DOCUMENTS 900,763 A 10/1908 Mcnutt
902,289 A * 10/1908 Mohr ...................... F24F 13/02 4/219
(Continued)

FOREIGN PATENT DOCUMENTS

AU 511081 B 6/1979
DE 149581 C 1/1902
(Continued)

OTHER PUBLICATIONS

International Search Report and Written Opinion mailed Jul. 25, 2023; International Patent Application No. PCT/US2023/020958 filed May 4, 2023; ISA/US. 6 pages.

*Primary Examiner* — Jeffrey R Allen
(74) *Attorney, Agent, or Firm* — McDonald Hopkins LLC

(57) ABSTRACT

Flame mitigation devices meeting all applicable regulatory requirements are described. The system includes a mesh element affixed to a closure fitment that is specially designed to couple to a rounded bead or edges on a container neck. Tamper-evident and child resistant features can be incorporated at the interfaces of the closure fitment and a cap that is removably attachable to the closure, whereas the closure is effectively coupled to the container in a permanent a manner.

15 Claims, 7 Drawing Sheets

Related U.S. Application Data filed on May 16, 2022, provisional application No. 63/338,257, filed on May 4, 2022.

(51) Int. Cl.

| | |
|---|---|
| ***B65D 25/38*** | (2006.01) |
| ***B65D 47/12*** | (2006.01) |
| ***B65D 50/04*** | (2006.01) |
| ***B65D 51/20*** | (2006.01) |

(52) U.S. Cl.

CPC ......... *B65D 47/123* (2013.01); *B65D 50/046* (2013.01); *B65D 51/20* (2013.01); *B65D 2213/00* (2013.01); *B65D 2251/0015* (2013.01); *B65D 2251/0087* (2013.01); *B65D 2401/15* (2020.05)

(58) Field of Classification Search

USPC .................. 220/88.1, 88.2, 86.3; 222/189.01

See application file for complete search history.

(56) References Cited

U.S. PATENT DOCUMENTS

| | | | | |
|---|---|---|---|---|
| 1,553,395 | A | 9/1925 | Ressler | |
| 1,792,198 | A | 2/1931 | Strindberg | |
| 1,816,323 | A | 7/1931 | Gluck | |
| 2,247,734 | A | 7/1941 | Schreiber | |
| 3,327,628 | A | 6/1967 | Loprest | |
| 3,711,259 | A | 1/1973 | Gurney | |
| 4,328,901 | A | 5/1982 | Gunderman et al. | |
| 4,483,461 | A | 11/1984 | Igarashi | |
| 4,489,860 | A | 12/1984 | Flider | |
| 5,051,103 | A | 9/1991 | Neuroth | |
| 5,215,312 | A | 6/1993 | Knappe | |
| 9,096,355 | B2 * | 8/2015 | Jensen ................. | B65D 47/043 |
| 9,126,067 | B2 | 9/2015 | Miscioscia | |
| 9,174,075 | B2 | 11/2015 | Cray | |
| 9,295,860 | B2 | 3/2016 | Koban | |
| 10,029,132 | B2 | 7/2018 | Cray | |
| 10,307,625 | B2 | 6/2019 | Cray | |
| 10,737,127 | B2 | 8/2020 | Johnston | |
| 10,792,525 | B2 | 10/2020 | Cray | |
| 11,807,421 | B2 | 11/2023 | Ouderkirk | |
| 2010/0311001 | A1 | 12/2010 | Helmsen | |
| 2011/0138325 | A1 | 6/2011 | Yang | |
| 2013/0087581 | A1 | 4/2013 | Jensen | |
| 2013/0206759 | A1 * | 8/2013 | Wurz ....................... | A62C 3/00 220/88.2 |
| 2018/0221693 | A1 | 8/2018 | Cray | |
| 2024/0382789 | A1 | 11/2024 | Koneshon | |

FOREIGN PATENT DOCUMENTS

| | | | |
|---|---|---|---|
| EP | 2812275 | A1 | 12/2014 |
| EP | 2812275 | B1 | 10/2017 |
| GB | 707414 | A | 4/1954 |
| WO | 2011138325 | A1 | 11/2011 |

* cited by examiner

CONTAINER AND CLOSURE SYSTEMS WITH FLAME MITIGATION

CROSS REFERENCE TO RELATED APPLICATIONS

This application is a 35 U.S.C. § 371 national stage application of PCT Application No. PCT/US2023/020958 filed on May 4, 2023, entitled "CONTAINER AND CLOSURE SYSTEMS WITH FLAME MITIGATION," which claims priority to the following United States provisional patent applications, all of which are incorporated by reference: 63/338,257 filed on May 4, 2022; 63/342,211 filed on May 16, 2022; and 63/351,965 filed on Jun. 14, 2022.

TECHNICAL FIELD

The present invention relates generally to a disposable, pre-filled storage container for flammable fuels and liquids having a flashpoint below 60° C. (140° F.) an attachable closure having an integrally formed or permanently affixed flame mitigation device disposed within the outlet to minimize or prevent the potential of flame jetting or container rupture.

BACKGROUND

Portable fuel containers are widely used for the transportation, storage, and dispensing of fuels, fire starters, additives for internal combustion engines, and other flammable liquids (i.e., liquids having a flashpoint below 60° C. (140° F.)). Often, these liquids are sold in disposable—and sometimes reusable—pre-filled, containers. Owing to their flammability, numerous statutory and regulatory requirements are imposed on manufacturers and sellers of such containers.

For example, the United States' Consumer Products Safety Commission has adopted or endorsed numerous standards published by ASTM International, including F3429; F3326; F2874; F2517; and F852. One of the primary areas for concern in this regard is to provide for a flame mitigation device. These usually take the form of a physical insert that prevent propagation of flames into or out of the container.

The flash point is the minimum temperature at which a liquid forms a vapor above its surface in sufficient concentration that it can be ignited, and the lower the flash point, the more easily that liquid can ignite. Liquids having a flash point of less than 100° F. are designated as "flammable," while "combustible" liquids have a flashpoint at or above 100° F. Most existing and anticipated statutory/regulatory schemes seek to mitigate against the impact of sparks and flames by providing a barrier to prevent, suppress, or delay ignition of vapors inherent to all flammable and combustible liquids, and especially those confined in containers with a narrow neck or outlet.

U.S. Pat. Nos. 1,553,395; 1,816,323; 1,792,198; 2,247,734; 3,327,628; 4,483,461; 9,126,067; 9,174,075; 9,295,860; 10,029,132; 10,307,625; and 10,792,525 all describe various mechanisms to suppress, arrest, or mitigate flame and explosion events in containers and transportation vessels for flammable liquids and fluids. All of these patents are incorporated by reference herein as background for the design considerations, purposes, and challenges in this field. German publication DE149581A, Australian patent AU511081B, British publication GB707414A, and European patent EP2812275B1 are similarly informative.

In general, many (if not all) of these flame mitigation devices rely upon entraining fuel in small apertures of a cup or screen that is disposed within the container neck. The vapor pressure emitted by the entrained fuel is sufficient to prevent combustible ratios of air and fuel from existing at the container opening, or the construction of the cup or screen is such that flames are quenched before they can travel beyond the screen.

One drawback to many of these structures is that they must be permanently affixed to the container. However, if they are integrally formed with the container, filling the container can become problematic because fluid flow through such small apertures can be slow, and/or the apertures may become clogged.

As a final consideration, many consumer products companies have initiated sustainability campaigns whereby packaging must manufactured from certain percentages (i.e., at least 67% and up to 95% or even 100%) of post-consumer resins (PCR) and/or capable of being introduced into PCR recycling systems. PCR resins may include (but is not limited to) certain grades of thermoplastics. Ideally, a single type of PCR resin is employed so that the closure can be introduced into recycling programs without the need to disassemble and/or separate parts, even in situations where the entirety of the closure might be comprised of recyclable materials (e.g., a plastic closure with a metal component must undergo disassembly and removal/sorting of such component to ensure that the metal does not foul the plastic recovery/recycling chain).

In view of the foregoing, a container with a closure that can be permanently affixed after the container is initially filled is needed, particularly one relying on conventional and extant neck finishes (i.e., having standard dimensions commonly used within the industry). Such a container must have a flame mitigation device meeting some of all of the aforementioned statutory and/or regulatory requirements. Further, the entire assembly should be made of cost effective, sustainable, and recyclable materials.

SUMMARY OF INVENTION

In addition to the benefits noted above, aspects of the inventions\ contemplated herein are generally directed toward the goals of: (i) impeding a bad actor's ability to place counterfeit products in a given container; (ii) preventing anyone from tampering with the product carried in that container or, at a minimum, providing easily recognized indicia to an end user that such tampering has occurred; and (iii) meeting various safety standards and/or legal/regulatory requirements in connection with flame mitigation and arresting or quenching ignited fumes or liquids from passing through a container neck and causing a broader fire or explosive event.

A flame mitigation system and device includes a closure defining an inner lumen. The closure includes an outer radial flange that has REL-type fitment features on its bottom facing, positioned between coaxially downwardly extending skirts. The inner facing of the lumen includes an inwardly protruding protective ring and, beneath that, a ledge that allows for attachment of a mesh element. The mesh element includes a specific arrangement of open area apertures and solid crossbars or wires, with optional vents provided in plastic-molded versions of the mesh. Critically, the distance between the mesh and the top of the spout, and the inner diameter of the spout and at the protective ring are determinative of the system's ability to meet the various requirements of a flame mitigation device as contemplated herein (whether in the form of ASTM test protocols or other criteria).

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure. Because the drawings are provided at scale, dimensional information and comparative ratios may be inferred, extrapolated, or otherwise obtained from the images in individual Figures (e.g., see FIG. 9).

In the drawings and attachments, all of which are incorporated as part of this disclosure.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Closures for sealing a container with added flame suppression and/or mitigation are contemplated. The container and closure combination may have any number of conventional features that are commonly encountered in this field, including but not limited to a screw fit arrangement between the cap and the closure to allow the closure to selectively removed and refitted. When fitted, the combination can form a watertight and/or hermetic seal. The initial removal of the cap from the closure engages, initiates, or otherwise enables the use of anti-counterfeiting, anti-tampering, authentication/verification, or other informational means as are known in this field.

The axial force required to secure the closure fitment to the container neck will lock those components in place. The disclosed embodiments here are particularly useful in combination with containers having a rolled neck finish with a tapered/narrow neck that terminates in a rounded and curving terminal edge, as shown in FIGS. 5A through 6B. Such neck finishes allow for filling the container before or after snap-fitting the closure onto the neck in a single axial motion (as compared to welding the fitment or rotating the fitment onto engagement features, such as threads, on the neck).

Figure 1A:
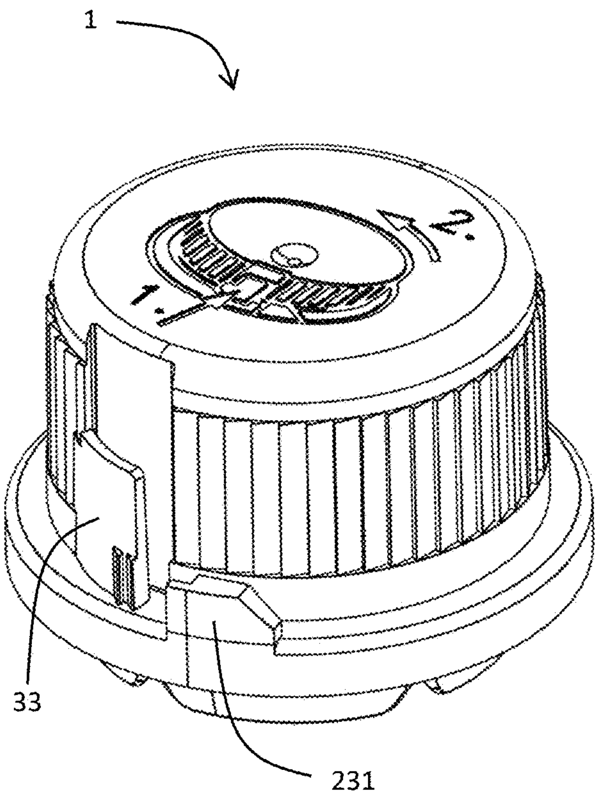
FIG. 1A is an isometric view of flame mitigation spout and cap in their assembled form, highlighting certain tamper-evident and child-resistant features.
Figure 1B:
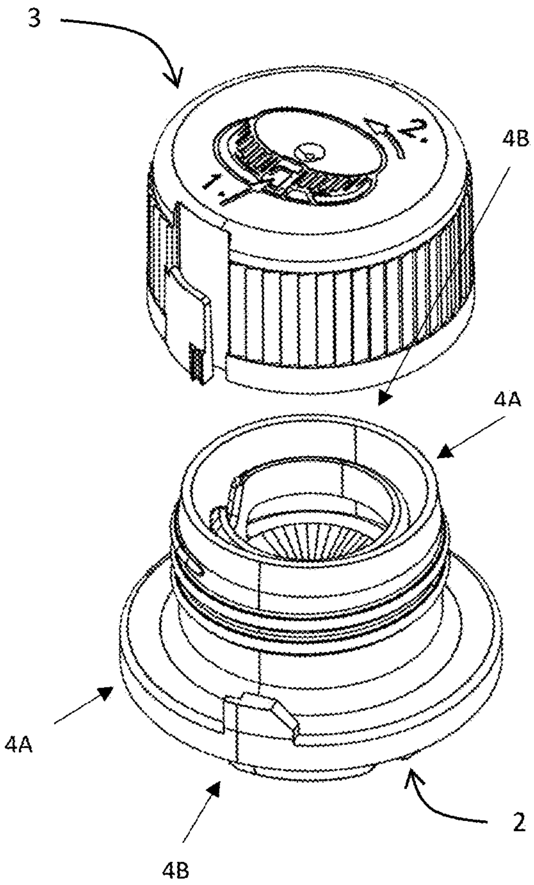
FIG. 1B is an exploded, to-scale view of the spout and cap contemplated in FIG. 1A.
Figure 2A:
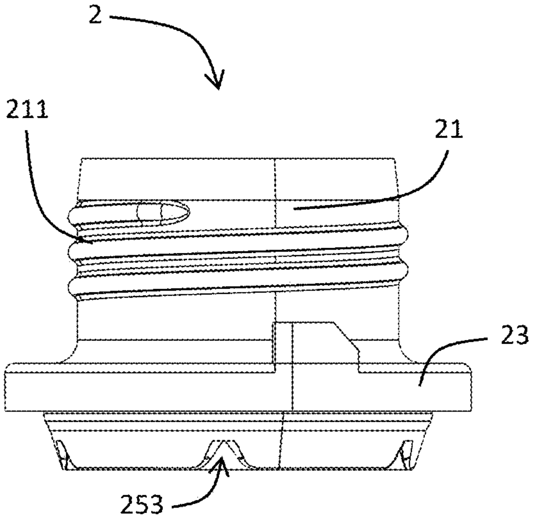
FIGS. 2A and 2B are complimentary front and side plan views of a first embodiment the spout of FIG. 1A.
Figure 2B:
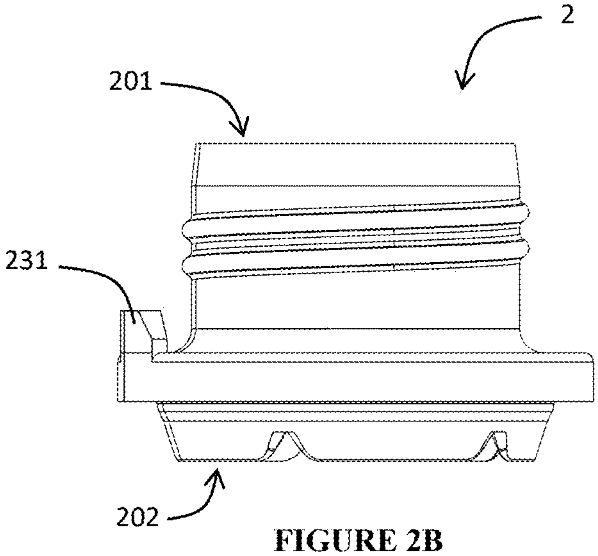
Figure 3:
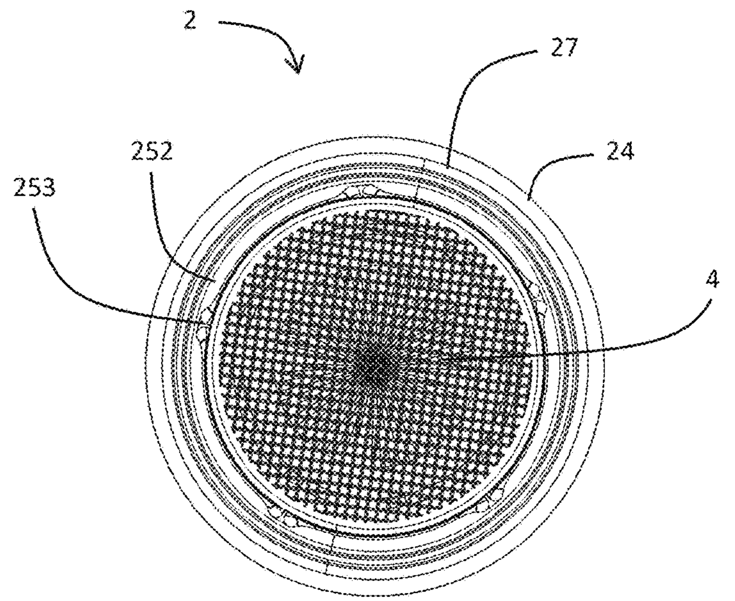
FIG. 3 is a bottom plan view of the spout of FIG. 2A.
Figure 8A:
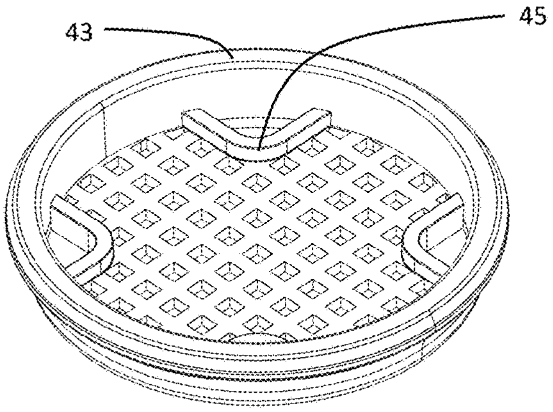
FIGS. 8A through 8C are various, isolated views of the mesh insert contemplated by the spout of FIG. 7A, with FIGS. 8A and 8B being complimentary top and bottom perspective vies and FIG. 8C being a cross sectional side view taken along a diameter of the mesh insert.
Figure 8B:
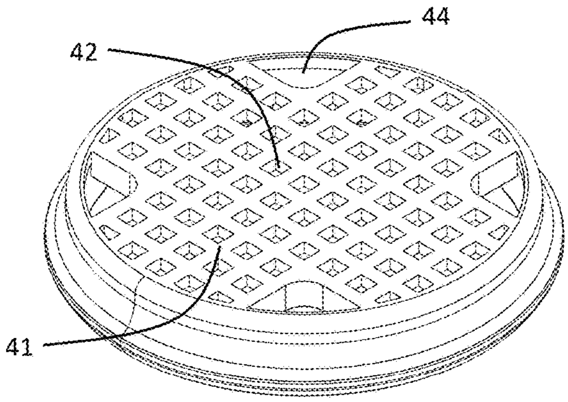
Figure 8C:
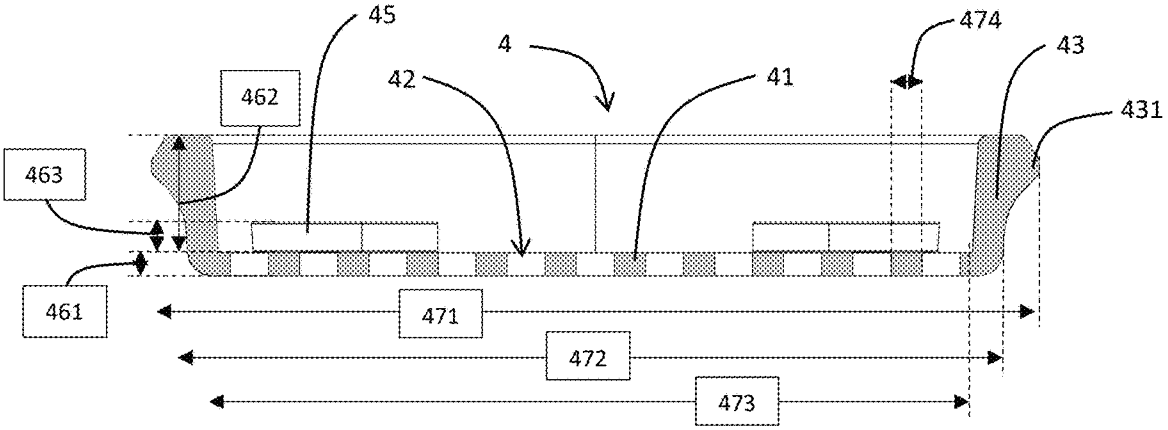
Figure 9:
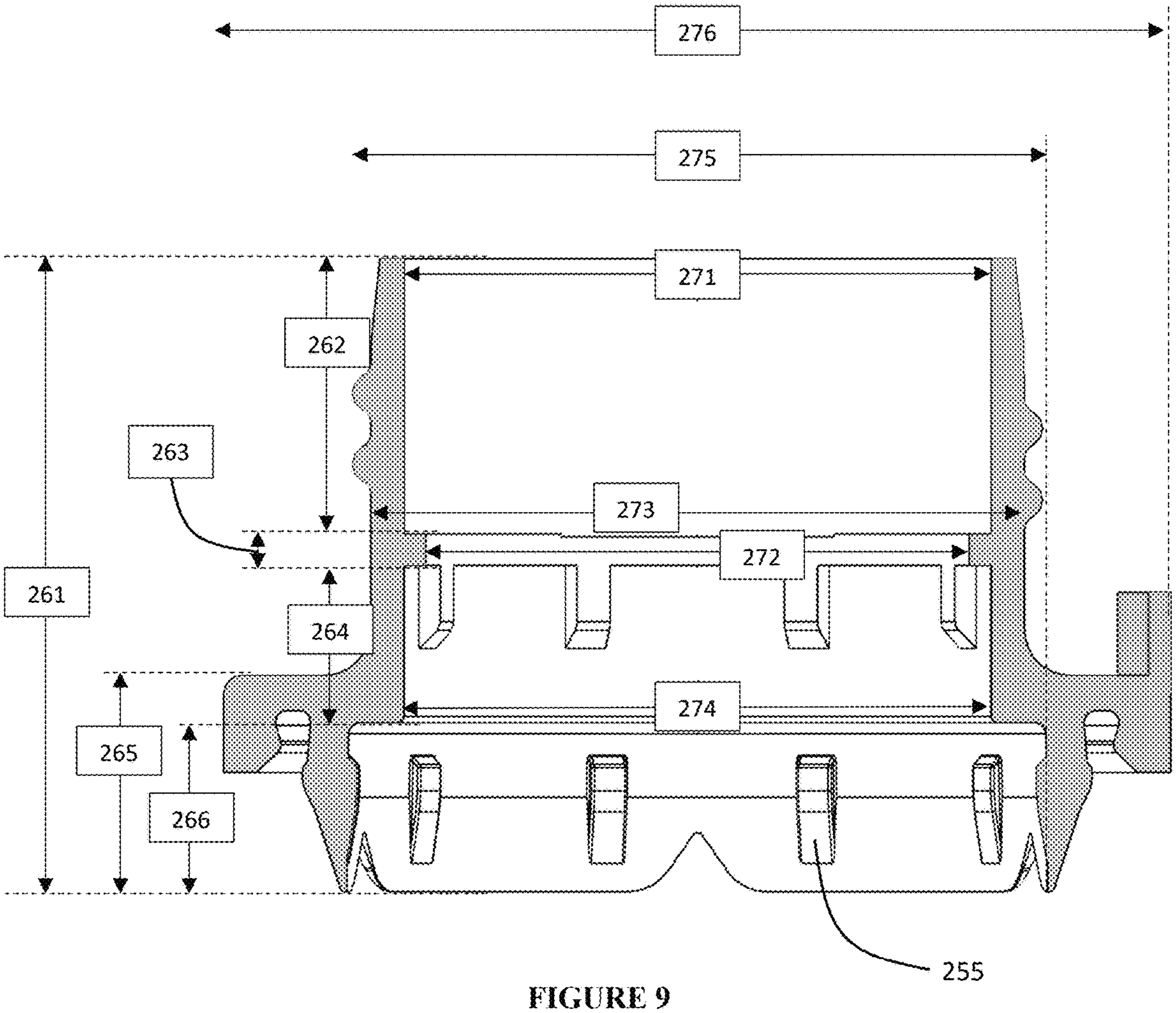
FIG. 9 is a cross sectional side view of an exemplary spout for purposes of defining certain dimensions and features that can be applicable to multiple embodiments.

FIGS. 1A, 1B, and 9, show elements or dimensions/ratios that are common to all disclosed embodiments, while FIGS. 2A through 8C which show discrete aspects that may be adopted individually or in combination with other aspects. In all instances, selected reference numerals may apply to multiple different embodiments, even if not all of the features depicted in an individual Figure are completely and comprehensively labeled.

Flame mitigation device and system 1 includes a closure fitment 2 with a removable cap 3. A mesh element or insert 4 is affixed along an inner lumen of the fitment, while a removable tamper-evident panel 5 can be affixed or integrally formed across that lumen above the mesh 4 along the midsection 205 of the closure 2. The lumen extends from the top 201 to the bottom 202 of the cylindrical body defining the total axial height 261 of closure 2, so as create a pour spout aperture 203 covered by the cap 3 and an inlet 204 disposed toward the container's interior volume. In some aspects, the mesh 4 is affixed to an annular insert 6 that is itself then affixed to the closure 2 along its inner lumen. The closure fitment 2 includes a circular attachment groove or gap 27 that is configured to receive a similarly curved edge 12 provided at the terminal end of a container 11. In some aspects, the container 11 and neck finish 12 can be formed from metal or alloys specifically selected for their compatibility with the flammable liquids carried within the container. Nevertheless, the system 1 could be employed with plastics, glass, or ceramic containers having appropriate features.

The top end 201 of the lumen can be a hollow circular cylinder with an angled or slightly tapering terminal edge, as characterized by the upper extension 21, and an inner diameter 271. Threads or other engagement features 211 on the outer surface of the extension 21 cooperate with threads or similar engagement features 34 found on the inner skirt 32 of the cap 3.

On the inner surface of the extension 21, preferably at or slightly below the elevation of features 21, a protective ring 22 projects radially into the lumen to define inner diameter 272 and outer diameter 273. Ring 22 may include strengthening supports 221 spaced apart circumferentially around the underside of the ring 22. The ring is positioned at an axial height 262 relative to the top 201, and ring 22 possesses its own thickness/height 263. Without wishing to be bound by any particular theory of operation, ring 22 is believed to create an obstruction for flames that might otherwise propagate within the lumen. It also creates turbulence for fluid flow along the otherwise smooth surfaces of the inner facings of the lumen, which delays penetration through the mesh (by flame, when present, and by fluids passing along the lumen).

The ring 22 can also accommodate the integral formation or attachment of a tamper-evident panel 5 that spans and blocks the lumen. If formed integrally (e.g., by way of an injection or other molding process), a thinned section 51 of the panel insures the panel 5 can be broken and removed by pulling and/or twisting with the bail handle 53. The main panel 52 may be flat or conically shaped and, in any event, will have a greater thickness in comparison to the thinned section in order to create predictable break lines. In some aspects, the main panel 52 is at least twice as thick and may be up to ten times as thick as the thinned section 51 (which itself will fully encircle the main panel 52 along its periphery).

Also within the midsection 205, an annular flange 23 protrudes outward at a substantially orthogonal angle in comparison to extension 21, so as to impart a comparatively larger outer diameter 276 at the flange in comparison to the outer diameter 273 near the ring 22 (i.e., along the entirety of extension 21). Flange 23 provides a seat and lower rotational stop for the cap 3, and a stopper 231 may be provided on an upper surface of the flange 23 for cooperating with tamper-evident and/or child-resistant features on the skirt 32 of the cap. In one aspect, the stopper 231 is an axially extending projection, possibly with an angled ramp, that catches a corresponding feature on the cap 3. In another aspect, splined edges could be formed within the flange 23 to serve as the stopper 231, so as to cooperate with compressible detents 35 on the cap 3 so that the skirt 32 must be flexed in order to release and rotate the cap 3 relative to the closure fitment 2.

Figure 5A:
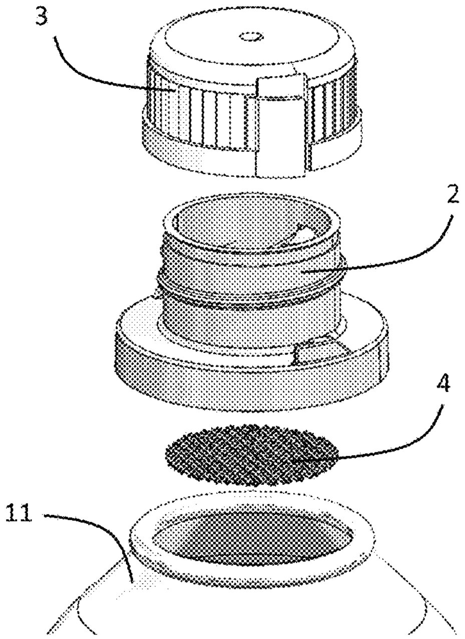
FIGS. 5A and 5B show a second embodiment of the spout and closure contemplated by FIG. 1A, with FIG. 5A being an exploded isometric view and FIG. 5B being a partial cross sectional view.
Figure 5B:
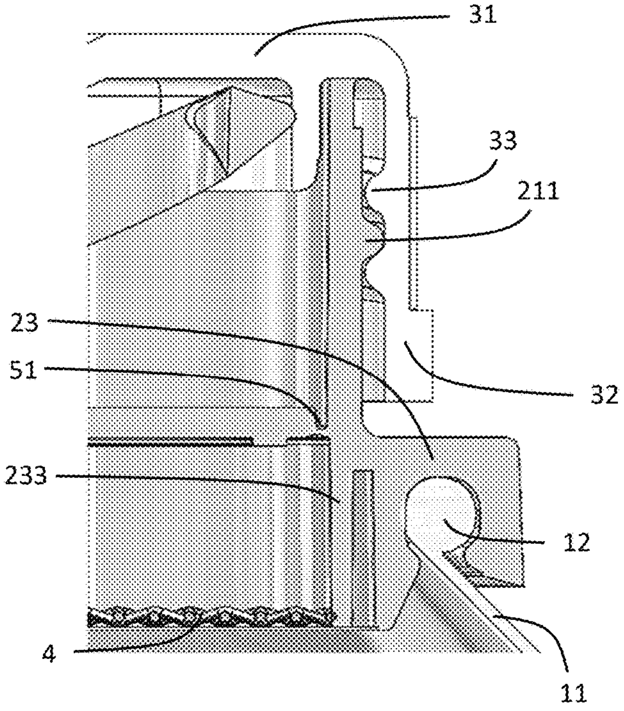

The elevation of the top of annular flange 23 is defined by axial height 265 in FIG. 9. A transitional ledge 232 is formed on the inner facing of the lumen at an axial height of 264 relative to the top 201. Ledge 232 provides a radially aligned surface for coupling the mesh 4, either by way of ultrasonic welding or heat-staking or by way of various coupling/engagement features 235. The ledge 232 defines an inner diameter 274 that may be the same or slightly larger than diameter 271 (with both diameters 271 and 274 being larger in comparison to the inner diameter 273 defined by the ring 22). In one aspect as shown in FIG. 5B, an integral cylinder or extension 233 extends axially away from the ledge 232. Other arrangements contemplate the provision of an annular groove 234 or other bayonet-style or snap-fitting protrusions with corresponding slots. Insofar as the ledge 232 creates an attachment point for the mesh 4, the elevation of the ledge serves as a proxy for the comparative positioning/elevation of the mesh 4 (see axial heights 264 and/or 266 in FIGS. 9 and 267*a* in FIGS. 4A and 267*b* in FIG. 7C).

A pair of skirts 24, 25 extend downward from the flange 23. Preferably, skirts 24, 25 are coaxially oriented, with the outer skirt 24 situated at the periphery of the flange and the inner plug seal skirt 25 aligned with or configured to be larger than the diameter of the upper extension 21 (as shown in FIGS. 4A, 4B, 5B, 6B, and 7C). Also, the plug seal skirt 25 should extend axially beyond the edge of the outer skirt 24, so that the plug seal skirt 25 effectively defines the bottom end 205 of the closure 2. That is, the plug seal skirt 25 is positioned between the diameter 274 and 276 and, more preferably between the diameter 273 and coaxially within the diameter defined by the inner most radial edge of the retention bead 241, with the axial length on the inner facing defined by height 266 (i.e., from edge 252 to ledge 232) and its total length by height 265 (i.e., from edge 252 to top facing of flange 23).

The outer skirt includes a retention bead 241 formed on its inner facing. The bead 241 will conform to outer edges of the container neck 12 so as to seal the closure 2 to the container 11. The bead 241 will also curve around so as to integrate with the curving surface along the gap 27 between the skirts 24, 25. Preferably, the curving surface of the gap 27 retains a common radius along a substantial portion of its arc, again allowing for a conforming and sealing arrangement between the lower surface of the flange 23 and the upper surface of the neck 12. The apex of that radiused curve may the have same or a higher elevation than the elevation of the ledge 232, relative to the bottom edge 202 (see axial height 266 in FIG. 9).

Outer skirt 24 may have a flat bottom edge, with an outer sidewall that conforms to the angle of extension 21. Both skirts 24, 25 will have sufficient flexibility and resilience to accommodate fitment to the container neck 12, although the overall construction (in terms of materials selection and dimensions of the skirts 24, 25) should insure the closure 2 is attached in an effectively permanent manner (i.e., so that it take significant and directed application of force to dislodge closure 2 from container neck 12).

The inner or plug seal skirt 25 should extend in a generally parallel direction in comparison to outer skirt 24 and, more preferably at a right angle to the radial flange 23. The axial height 265 of the inner skirt 25 relative to the ledge 232 will include a tapered or wedge-shaped edge 252 at the bottom 202. Along an outer facing, retention bead 251 extends radially outward at or below bead 241 on the outer skirt 24. As such, bead 251 effectively defines the inner edge of gap 27, meaning it should conform to the aforementioned curved surface (beads 241 and 251 also insure good attachment to the container 11).

The inner facing of plug seal skirt 25 may include multiple engagement features. Retention groove 255 can accommodate a corresponding feature on the outer diameter of the mesh, and it provides for greater exposed surface area on the bottom facing of ledge 23 in order to weld or heat-stake the mesh element 4. Groove 255 and tapered edge 252 also operate impart the plug seal skirt 25 with a wedge shape in which the maximum radial thickness of the skirt 25 is along the bead 251 (which is itself at a lower elevation relative to the bottom 202 than groove 255). Notably, groove 255 is larger in comparison to groove 234 and, while it is possible to provide both, groove 255 may prove to be more easily accommodated than 234 in a substantial number of designs/iterations.

Additionally, a series of retention protrusions 254 can be positioned on the inner facing of the plug seal skirt 25. These protrusions 254 are spaced apart define a circumference in which the mesh insert 4 can be held. Along the lower edge 252, a series of spaced apart gaps 253 extend axially upward into the skirt 25, so as to allow for greater flexibility in the skirt 25 and tolerances for fitment and sealing efficacy between the closure 2 and container 11.

In some aspects, an annular insert 6 can be used. This insert 6 allows for the mesh to be attached separately and then snap-fitted or otherwise attached to the closure by way of any one of groove 234, engagement features 235, or groove 255. In particular, a flange 61 extends radially outward from the cylinder defined by insert 6, preferably at its top end. A skirt 62 extends down from flange 61 so that the mesh can be attached to the bottom and/or an inner facing of the skirt 62. Insert 6 should prove particularly useful in the event a wire mesh is heat-staked. Insert 6 also allows for the use of a different polymeric material in comparison to the composition/construction of the closure 2, which allows for greater flexibility in manufacturing operations.

The mesh element 4 may take one of two basic forms. Both forms rely on intersecting wires or crossbars 41, which necessarily define apertures 42 along the entire planar facing of the mesh 4. Without wishing to be bound by any theory of operation, the solid crossbars impede the flow of fluid (and particularly volatile vapors) by creating turbulence and obstructions relative to the propagation of flame through that facing. Additionally or alternatively, the apertures 42 may retain liquid, owing to surface tension/adhesion and Van Der Waals forces. The presence of such liquid could alter the concentration of volatile vapor around the mesh 4, thereby acting as an impediment to creation or propagation of flame through the mesh 4.

Figure 4A:
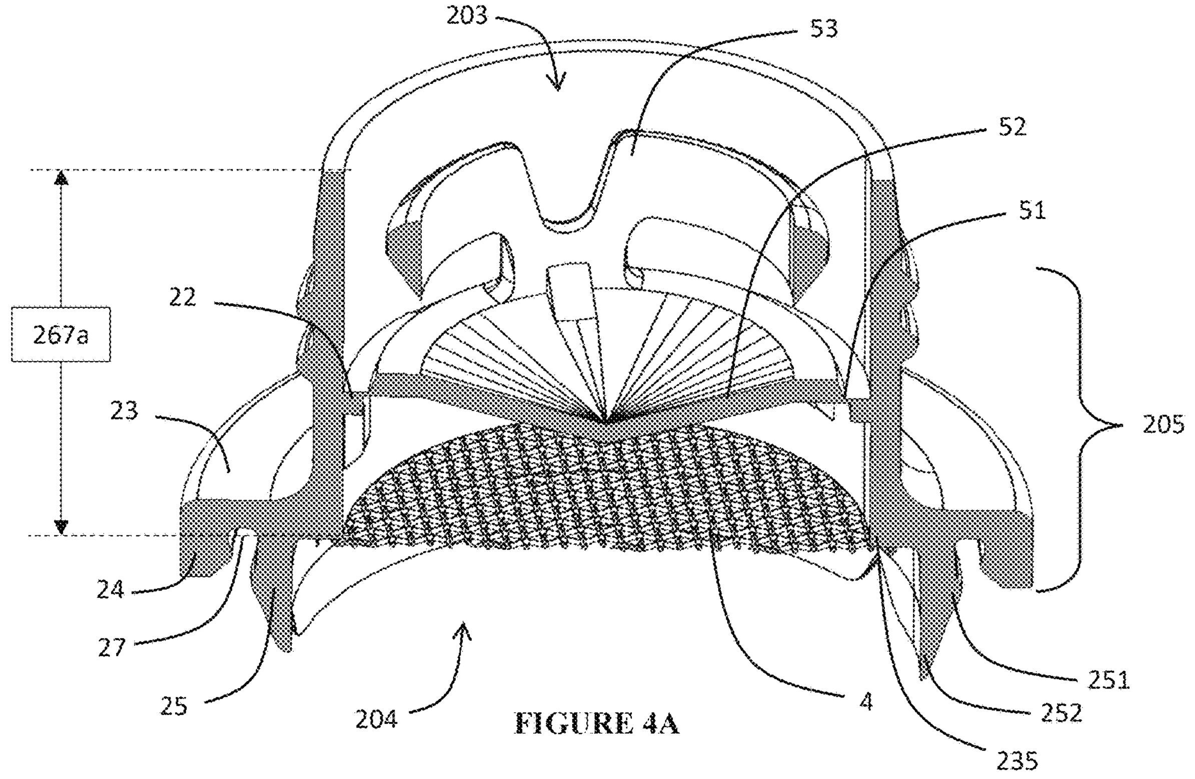
FIGS. 4A through 4C are three dimensional perspective views of the spout of FIG. 2A, with FIGS. 4A and 4B being cross sectional views (taken across the diameter of the spout in the planes defined by lines 4A-4A and 4B-4B in FIG. 1B, respectively speaking) and FIG. 4C being a cross sectional three dimensional view (taken in a transverse plane that is at a midsection of the spout and orthogonal to the cross sectional plane in FIG. 4A).
Figure 4B:
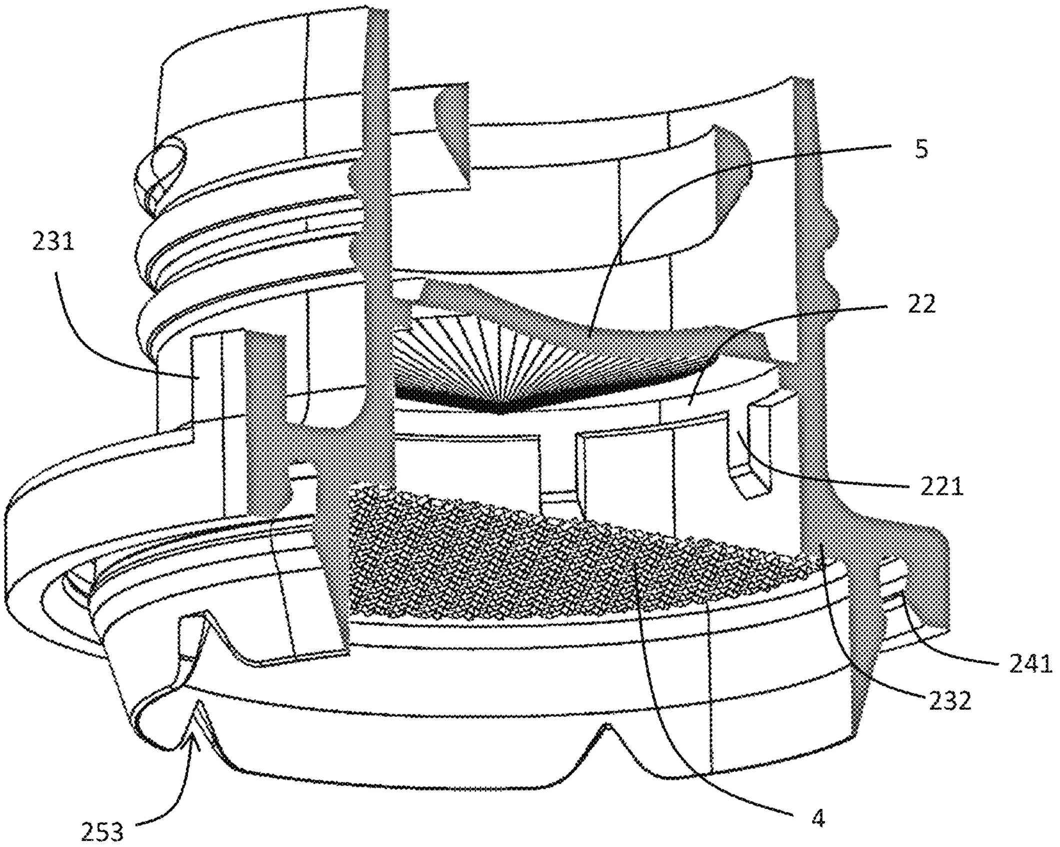
Figure 4C:
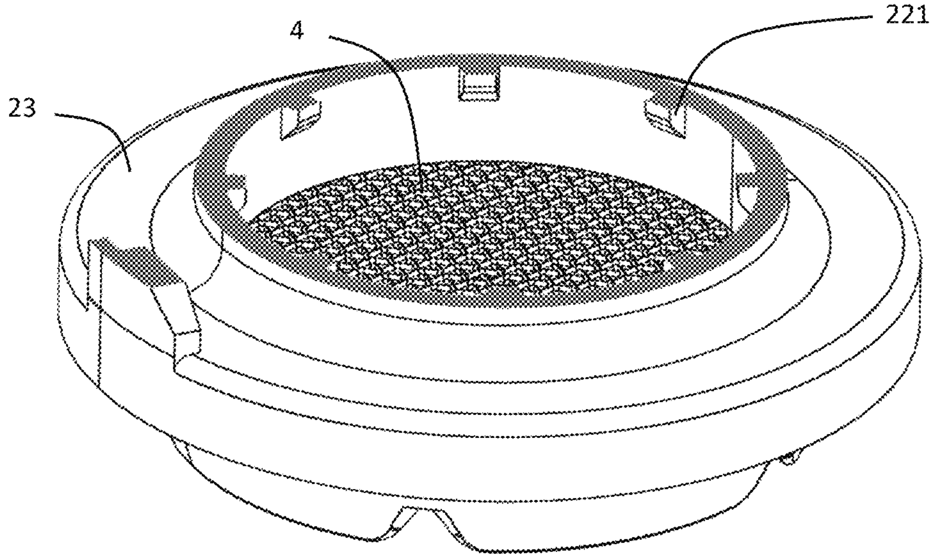
Figure 6A:
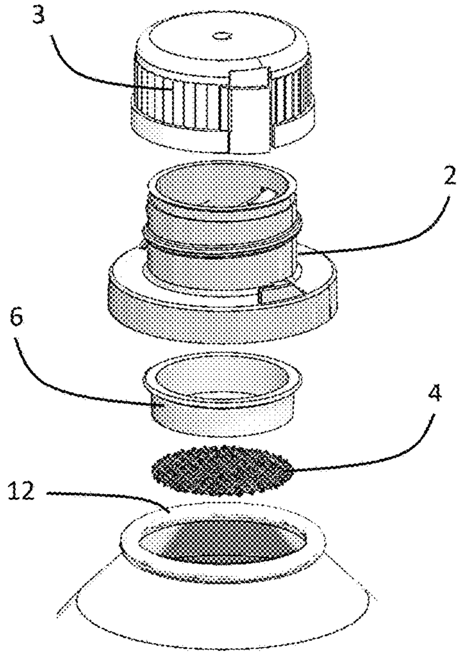
FIGS. 6A and 6B show a third embodiment of the spout and closure contemplated by FIG. 1A but including an annular insert, with FIG. 6A being an exploded isometric view and FIG. 6B being a partial cross sectional view.
Figure 6B:
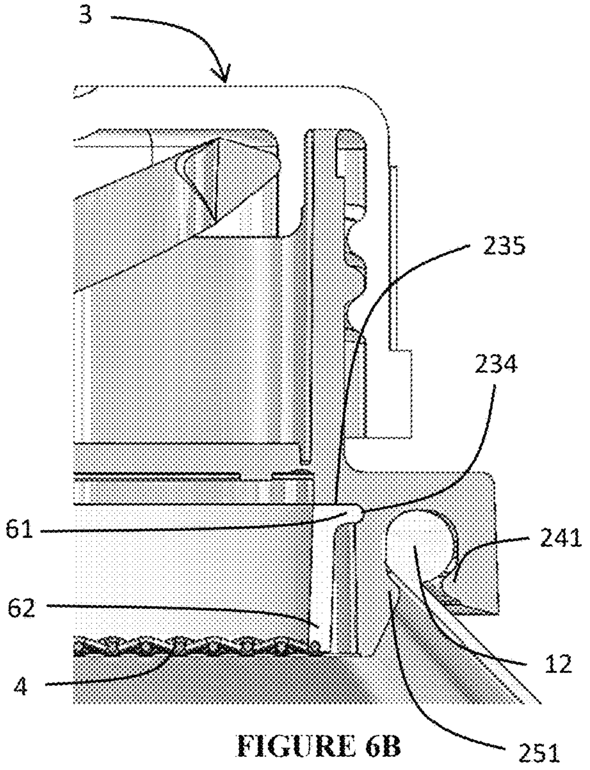
Figure 7A:
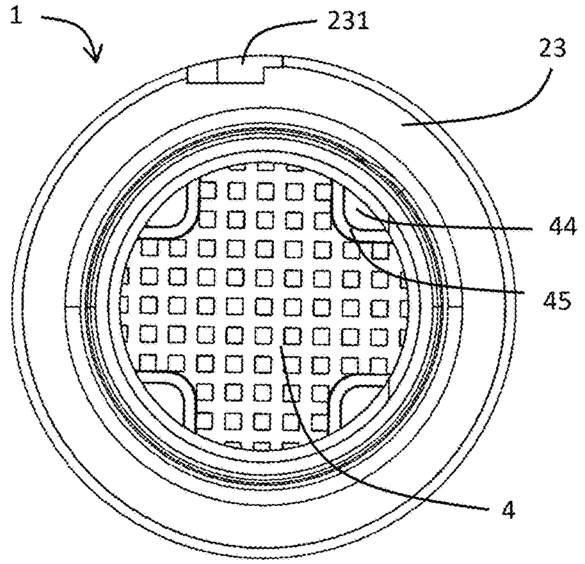
FIGS. 7A through 7C are various views of a fourth embodiment of a spout contemplated by FIG. 1A, with FIGS. 7A and 7B being top and bottom plan views, respectively speaking, and FIG. 7C being a cross sectional three dimensional view taken along a diameter of the spout coinciding with the stopper on the outer flange.
Figure 7B:
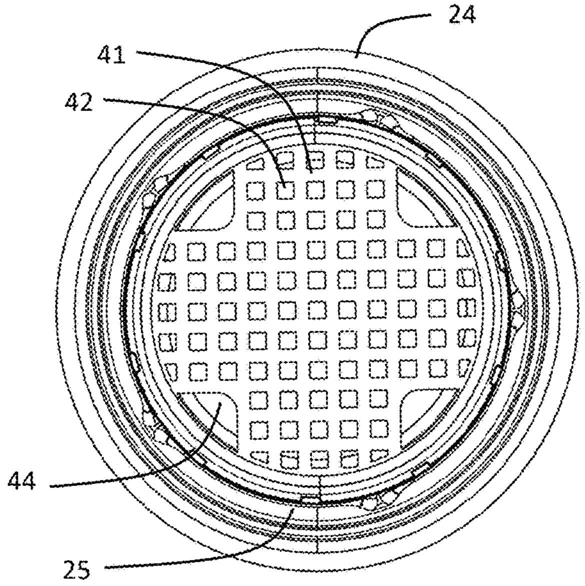
Figure 7C:
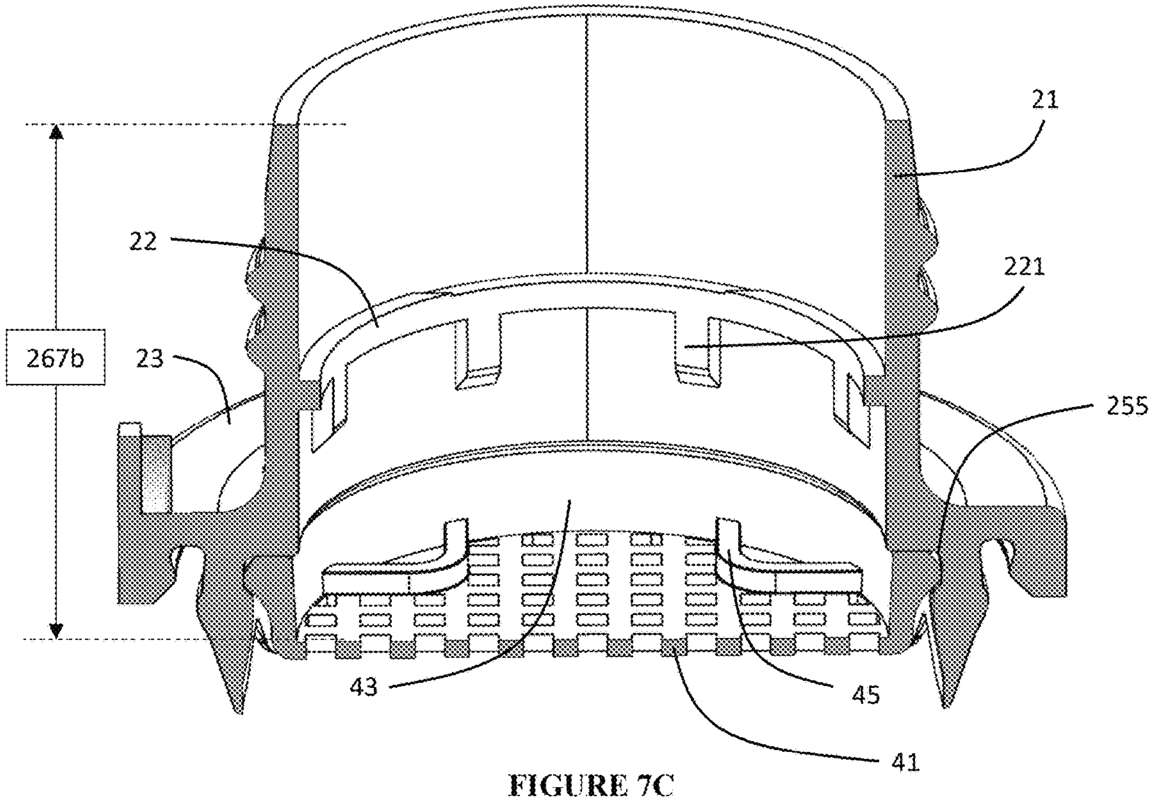

The first form of mesh 4 is seen in FIGS. 4B, 5B, and 6B. Here, two sets of parallel metal wires are used to created the mesh. Each wire in each set has a serpentine shape, so that it regularly bends at a regular, alternating angle so as to allow the two sets of wires to be intertwined. The wires should have a comparative diameter/thickness of 9 units (+/−2) in comparison to the 26 unit (+/−2) length of the square apertures. When the sets of wires are intermeshed, the total thickness (from top planar surface to bottom planar surface) is about 18 units (+/−2).

This first form of mesh 4 has a peripheral shape selected to match the cross sectional shape of the lumen in the closure 2 at the elevation of the ledge 23. Preferably, the shape will be circular or oval, with the diameter/width of the mesh 4 exceeding the inner diameter 274 (but necessarily smaller than the inner diameter 275 of the plug seal 275). If an annular insert 6 is employed, the mesh 4 should be sized and shaped to conform to that insert 6.

When the mesh is made of metal or materials sufficiently higher in softening/melting point as compared to the materials of the closure 2 or insert 6, ultrasonic welding or heat-staking operations can be employed to couple the mesh 4 accordingly. Heat-staking involves the localized application of heat around the periphery so as to melt or soften the ledge 23 or insert 6, with the mesh 4 pressed and embedded therein. Upon cooling, the mesh 4 becomes coupled/attached with sufficient strength to withstand expected testing procedures (e.g., any of the aforementioned ASTM protocols from the background section above).

As an alternative, mesh insert 4 can be formed by polymeric molding. Here, the cross bars (i.e., wires) and apertures are likely to have larger dimensions in comparison to the metal form, so as to accommodate the molding process. For example, the aperture size will be 50 units in comparison to the 39 unit axial height of the shroud This second form of mesh 4 can be formed in a flat plane as illustrate in FIGS. 8A through 8C. Notably, a peripheral skirt 43 includes engagement features 431, such as a radially protruding bead, preferably at the terminal and/or top edge of the skirt 43, thereby imparting a maximum outer diameter 471 to the insert. The skirt 43 slopes, angles, or tapers down to a minimum outer diameter 472, with the mesh formed completely within the inner diameter 473.

In this second form, the mesh includes a series of vent apertures 44 that are significantly larger than the mesh apertures 42. These vents 44 allow for proper flow of fluids, and particularly make-up air, so as to minimize unwanted pressure differentials during pouring that might otherwise lead to inconsistent dispensing and/or "glugging". Preferably, 4 vents (and anywhere from 2 or 3 up to 5, 6, 7, or 8) can be spaced apart at equal distances around the inner periphery. Each vent will have an axial shroud 45 to improve the performance of flame mitigation and dispensing.

The shrouds will extend an axial height 463 above the top facing of the mesh. In comparison, the mesh possesses its own axial thickness or height 461 that is the same as or smaller than that of shroud height 463. The skirt 43 should possess an axial height (i.e., the combined axial distance 462 (measure from edge to top of the mesh) and mesh thickness 461) that is at least twice as larger than the shroud height 463 and up to five times as large.

As shown in FIGS. 8A and 8B, four vents equally spaced apart are provided along the perimeter. Each vent is formed in a shape approximating an Isooceles triangle, except that the equal length sides may actually vary slightly (<5% difference), while the elongate side is arcuate to match the circumference of the circular shape of the mesh. Also, the right angle formed by the shorter sides has a radiused corner. Nevertheless, the total open surface area of the vent is about 4 to 5 times larger in comparison to the open surface area of a single aperture. In one aspect in which the horizontal thickness 474 of each crossbar/wire is one unit, the vertical thickness 461 of the crossbar/wire is 0.75 units and the size of each aperture in the mesh is 1.25×1.25 units (each providing about 1.56 $\text{unit}^2$ of open area). In turn, 69 complete square apertures and an additional 8 partial apertures (having about 50-75% the size of the complete apertures) are paired with 4 triangular vents, each having an approximate open area of between 10 to 11 $\text{units}^2$ of open area. Each vent is surrounded on its elongated side by the inner facing of the skirt 43 and on its equal sides by a shroud 45 that rises about 0.88 units above the top planar surface of the mesh. This arrangement enables sufficient pass-through capability for liquid and gaseous fluids while still affording adequate flame mitigation performance.

Critically, the inventors have also discovered the relative dimensions and axial elevation of the mesh 4 impact its flame mitigation properties relative to the size and shape of the "REL" style snap-fitting closure 2 contemplated herein. Specifically, the distance/height 267*a*, 267*b* from mesh 4 (depending on the type of mesh) to the top 201 of spout 203 will influence the ability of the system 1 to pass the aforementioned ASTM tests of interest. As such (and in addition to the other dimensional relationships inherent to FIGS. 4C, 7C, 8C, and 9), the dimensions, ranges, and ratios set forth in Tables 1-3 are preferred aspects of the inventive system:

TABLE 1

| Dimensions (in.) of Closure | | | | |
|---|---|---|---|---|
| Drawing Ref. # | ID and Description | Min. | Max. | Preferred |
| 271 | A. Top (201) inner diameter | 0.965 | 0.985 | 0.970 |
| 272 | B. Ring (22) inner diameter | 0.880 | 0.910 | 0.900 |
| 262 | C. Top (201) to ring (22) | 0.440 | 0.480 | 0.460 |
| 267a | Da. Top (201) to mesh (4, metal) | 0.750 | 0.790 | 0.770 |
| 267b | Db. Top (201 to mesh (4, plastic) | 0.930 | 0.970 | 0.950 |

TABLE 2

| Exemplary ratios, with reference to ID of Table 1 | | | |
|---|---|---|---|
| Relationship | Min. | Max. | Preferred |
| A/B (all) | 1.00 | 1.20 | 1.08 |
| A/C (all) | 1.50 | 2.50 | 2.11 |
| A/Da (metal mesh) | 1.00 | 1.50 | 1.26 |
| A/Db (plastic mesh) | 1.00 | 1.50 | 1.02 |

TABLE 3

| Dimensions (in.) of Mesh (Metal and Plastic) | | | | |
|---|---|---|---|---|
| Type | Description | Min. | Max. | Preferred |
| Metal | Wire size | 0.007 | 0.011 | 0.009 |
| Metal | Opening (aperture) size | 0.024 | 0.028 | 0.026 |
| Metal | Total thickness (woven) | 0.016 | 0.020 | 0.018 |
| Plastic | Hole (aperture) size, square side | 0.037 | 0.041 | 0.039 |
| Plastic | Vent size, equal length sides | 0.010 | 0.014 | 0.012 |
| Plastic | Vent size, radius length to elongate size | 0.004 | 0.008 | 0.006 |

Additionally, the mass of solid material in comparison to the open surface area within the inner lumen (i.e., the mesh apertures 42 and, when present, vents 44) also play a significant role. In that regard, the total surface area on the top face of a plastic mesh (as in FIGS. 8A to 8C, as described above) is about 1,000 to 1,050 units$^2$, whereas the open surface area (apertures and vents) is between 148 to 164 units$^2$, meaning about 14.0 to 16.5% of the top surface area is open. Notably, while specific values are provided, it will be understood that integers within these ranges, as well as up to +/−5% of the stated values, are deemed to be disclosed and each constitute distinct aspects of the invention. Similarly volumetric embodiments can be calculated on the basis of the mesh having a thickness of 0.75 units$^2$, while the density of common injection molded polymers (e.g., polypropylene, polyethylene, etc.) allow for the invention to be defined on the basis of mass of materials.

With respect to the metal mesh, anywhere from 740 to 780 apertures can be formed based on the dimensions contemplated above. With the square faces of the apertures being about 2.89 times larger than the thickness of the wire itself and the diameter of the exposed top portion of the mesh being between 100 to 110 times larger than those faces, the percentage of open surface area is similar, between 13.5 to 14.5% of open surface area. As with the plastic embodiment, intervening integers and +/−5% of the stated values are deemed to be disclosed and each constitute distinct aspects of the invention.

In summary, in addition to the specific features of the closure (namely, a spout, the snap-on neck fitment, the pour spout, the flame-arresting protective ring, and a mesh that is specifically designed to allow fluid—both liquid and gas—to flow through the mesh), the inventors determined various combinations of the distance from the top of the spout to the top of the mesh, the inner diameter of the spout, the inner diameter of the protective ring, and the open area of the mesh itself (in comparison to the solid material forming the crossbars of the mesh) all contribute to the flame mitigation performance in this particular closure. Specifically, the maximum, minimum, and preferred ranges in Table 2 can be selected, along with an open area on the mesh that is between 10 to 20% (i.e., 10% of the total surface area is occupied by void/apertures) and as disclosed above, with more preferred ranges of 13 to 17%, 14 to 16%, and about 15% being recognized as part of the inventive design in some aspects.

To the extent a separate annular insert is employed for attaching the mesh (either by heat staking a metal mesh to the insert or by integrally forming a plastic mesh on/with the insert based upon the description and characteristics of the style of mesh shown in FIG. 8A to 8C), the insert will have sufficient dimension to achieve the ratios and dimensions described above. One of the advantages of using such an additional insert is that it may provide for greater flexibility in manufacturing operations.

All components should be made of materials having sufficient flexibility and structural integrity, as well as a chemically inert nature. The materials should also be selected for workability, cost, and weight. Common polymers amenable to injection molding, extrusion, or other common forming processes should have particular utility for forming the closure fitment/tamper evident panel as a single piece (as well as the cap and, when used, the mesh insert as separate pieces). Polymers, metals, alloys, and other composites may be used in place of or in addition to more conventional container materials, so long as the neck finish 12 cooperates with the size and shape of the gap 27.

Certain grades of polypropylene and polyethylene are particularly advantageous, especially in view of the absence of any thermosetting resins, elastomeric polymer blends, and other chemically distinct polymers or copolymers (in comparison to the other components of the dispensing pump). Notably, high density polyethylene (i.e., having a density of greater than 0.940 g/cm$^3$) may provide different characteristics in comparison to lower density polyethylene types (e.g., medium density at 0.925 to 0.940 g/cm$^3$ and/or lower density at 0.880 to 0.925 g/cm$^3$), as would specialized blends or copolymers capable of cross-linking for greater stiffness.

Nylon is envisioned as useful for annular inserts, and it may possess certain advantages from a molding and manufacturing perspective. Fluorination and/or irradiation provide still more degrees of freedom in polymeric materials selection and treatments to impart desired qualities.

The design of interfaces and attaching/coupling components should be sufficient to create a minimum retention force of at least fifteen pounds (whether exerted from the top or the bottom of the closure lumen). Designs should also account for flame exposure times should exceed thirty seconds with a two inch flame without failure. In these regards, the embodiments illustrated in FIGS. 2A through 9 are capable of meeting these criteria, while allowing for scale-up or scale-down depending upon the container neck size. By way of example rather than limitation, exemplary containers should possess a neck size of 28 mm to 38 mm, although larger and smaller configurations are possible.

In view of the foregoing, a system and closure for mitigating propagation of flames is contemplated. The system includes a closure having a cylindrical body, defining an inner lumen with a protective ring and a ledge formed therein, and a radial flange on an outer facing of the body, with an outer skirt and an inner plug seal skirt both extending downwardly from the radial flange so as to define an attachment gap on an underside along a periphery of the radial flange. A mesh element is coupled to the closure so as to abut the ledge, the mesh element including a plurality of crossbars and apertures configured to completely span the inner lumen. Additionally, an uppermost edge of the inner lumen defines a spout, a diameter of the inner lumen across the spout defines a spout diameter, a diameter of the inner lumen across the protective ring defines a ring diameter, an axial distance from the uppermost edge to a top facing of the protective ring defines a ring axial height, and an axial distance from the uppermost edge to a top facing the plurality of crossbars and apertures defines a mesh axial height. Given the foregoing, at least one (and possibly all) of the following dimensional ratios apply: i) the spout diameter to the ring diameter is between 1.00 and 1.20, ii) the spout diameter to the ring axial height is between 1.50 and 2.50, and iii) the spout diameter to the mesh axial height is between 1.00 and 1.50. Additional aspects may include any combination or permutation of the following:

- wherein each of the dimensional ratios is fulfilled;
- wherein the spout diameter to the ring diameter is 1.08, the spout diameter to the ring axial height is 2.11, and the spout diameter to the mesh axial height is between 1.02 and 1.26;
- wherein the apertures define a cumulative open surface area and the plurality of crossbars define a cumulative solid surface area, both along a plane coinciding with the top facing of the mesh and wherein the cumulative open surface area is between 10 and 20% and the solid surface area is between 80 and 90% of a total surface area of the plane;
- wherein the apertures define a cumulative open surface area and the plurality of crossbars define a cumulative solid surface area, both along a plane coinciding with the top facing of the mesh and wherein the cumulative open surface area is between 10 and 20% and the solid surface area is between 80 and 90% of a total surface area of the plane;
- wherein cumulative open surface area is between 13 and 17% and the solid surface area is between 87 and 93% of the total surface area of the plane;
- wherein the mesh element consists of a wire mesh heat-staked directly to the ledge;
- wherein the mesh element is formed as an annular insert having engagement features cooperating with engagement features formed on the inner lumen below the protective ring and wherein a wire mesh is heat-staked directly to the annular insert;
- wherein the mesh element consists of a molded insert having a peripheral skirt with outer engagement features cooperating with engagement features formed on the inner lumen below the protective ring and wherein the plurality of crossbars and apertures are formed integrally as part of the peripheral skirt;
- wherein the molded insert includes one or more vents provided within the plurality of crossbars and apertures and wherein each vent is surrounded by a shroud that extends axially above the top facing of the plurality of crossbars and apertures;
- wherein one or more retention features are provided on an inner facing of the inner plug seal skirt, with the one or more retention features configured and positioned to retain the molded insert;
- a container having neck with a curved terminal edge and wherein the attachment gap is configured to sealingly couple to the curved terminal edge;
- a cap rotatably affixed to the closure body, with cooperating child-resistant features formed on: i) a skirt extending downwardly from a top panel of the cap, and ii) a top facing of the radial flange;
- wherein the cylindrical body includes a removable tamper evident panel sealing the inner lumen at, above, or below the protective ring; and
- wherein the plurality of crossbars is formed by woven metallic wires in which a first series of parallel wire strands aligned in a first direction intersect with a second series of parallel wired strands so that interstices between the first and second series of wires define the apertures.

References to coupling in this disclosure are to be understood as encompassing any of the conventional means used in this field. This may take the form of snap- or force fitting of components, although threaded connections, bead-and-groove, and bayonet-style/slot-and-flange assemblies could be employed. Adhesive and fasteners could also be used, although such components must be judiciously selected so as to retain the recyclable nature of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A system for mitigating propagation of flames through a closure attached to a container neck, the system comprising:

a closure having a cylindrical body, defining an inner lumen with a protective ring and a ledge formed therein, and a radial flange on an outer facing of the body, with an outer skirt and an inner plug seal skirt both extending downwardly from the radial flange so as to define an attachment gap on an underside along a periphery of the radial flange;

a mesh element is coupled to the closure so as to abut the ledge, the mesh element including a plurality of crossbars and apertures configured to completely span the inner lumen;

wherein an uppermost edge of the inner lumen defines a spout, a diameter of the inner lumen across the spout defines a spout diameter, a diameter of the inner lumen across the protective ring defines a ring diameter, an axial distance from the uppermost edge of the lumen to a top facing of the protective ring defines a ring axial height, and an axial distance from the uppermost edge of the lumen to a top facing the plurality of crossbars and apertures defines a mesh axial height; and wherein at least one of the following dimensional ratios applies: i) the spout diameter to the ring diameter is between 1.00 and 1.20, ii) the spout diameter to the ring axial height is between 1.50 and 2.50, and iii) the spout diameter to the mesh axial height is between 1.00 and 1.50.

2. The system according to claim 1 wherein each of the dimensional ratios is fulfilled.

3. The system according to claim 2 wherein the spout diameter to the ring diameter is 1.08, the spout diameter to the ring axial height is 2.11, and the spout diameter to the mesh axial height is between 1.02 and 1.26.

4. The system according to claim 3 wherein the apertures define a cumulative open surface area and the plurality of crossbars define a cumulative solid surface area, both along a plane coinciding with a top facing of the mesh and wherein the cumulative open surface area is between 10 and 20% and the solid surface area is between 80 and 90% of a total surface area of the plane.

5. The system according to claim 1 wherein the apertures define a cumulative open surface area and the plurality of crossbars define a cumulative solid surface area, both along a plane coinciding with a top facing of the mesh and wherein the cumulative open surface area is between 10 and 20% and the solid surface area is between 80 and 90% of a total surface area of the plane.

6. The system according to claim 5 wherein cumulative open surface area is between 13 and 17% and the solid surface area is between 87 and 93% of the total surface area of the plane.

7. The system according to claim 1 wherein the mesh element consists of a wire mesh heat-staked directly to the ledge.

8. The system according to claim 1 wherein the mesh element is formed as an annular insert having engagement features cooperating with engagement features formed on the inner lumen below the protective ring and wherein a wire mesh is heat-staked directly to the annular insert.

9. The system according to claim 1 wherein the mesh element consists of a molded insert having a peripheral skirt with outer engagement features cooperating with engagement features formed on the inner lumen below the protective ring and wherein the plurality of crossbars and apertures are formed integrally as part of the peripheral skirt.

10. The system according to claim 9 wherein the molded insert includes one or more vents provided within the plurality of crossbars and apertures and wherein each vent is surrounded by a shroud that extends axially above the top facing of the plurality of crossbars and apertures.

11. The system according to claim 9 wherein one or more retention features are provided on an inner facing of the inner plug seal skirt, with the one or more retention features configured and positioned to retain the molded insert.

12. The system according to claim 1 further comprising a container having neck with a curved terminal edge and wherein the attachment gap is configured to sealingly couple to the curved terminal edge.

13. The system according to claim 1 further comprising a cap rotatably affixed to the closure body, with cooperating child-resistant features formed on: i) a skirt extending downwardly from a top panel of the cap, and ii) a top facing of the radial flange.

14. The system according to claim 1 wherein the cylindrical body includes a removable tamper evident panel sealing the inner lumen.

15. The system according to claim 1 wherein the plurality of crossbars is formed by woven metallic wires in which a first series of parallel wire strands aligned in a first direction intersect with a second series of parallel wired strands so that interstices between the first and second series of wires define the apertures.

* * * * *